(12) United States Patent
Kansara (10) Patent No.: US 12,293,779 B2
(45) Date of Patent: May 6, 2025

(54) TECHNIQUES FOR AUTOMATICALLY EXTRACTING COMPELLING PORTIONS OF A MEDIA CONTENT ITEM

(71) Applicant: NETFLIX, INC., Los Gatos, CA (US)

(72) Inventor: Apurvakumar Dilipkumar Kansara, San Jose, CA (US)

(73) Assignee: NETFLIX, INC., Los Gatos, CA (US)

( * ) Notice: Subject to any disclaimer, the term of this patent is extended or adjusted under 35 U.S.C. 154(b) by 0 days.

(21) Appl. No.: 17/745,718

(22) Filed: May 16, 2022

(65) Prior Publication Data

US 2022/0277564 A1     Sep. 1, 2022

Related U.S. Application Data

(63) Continuation of application No. 16/689,019, filed on Nov. 19, 2019, now Pat. No. 11,334,752.

(51) Int. Cl.
*G11B 27/031*     (2006.01)
*G06F 18/23213*     (2023.01)
(Continued)

(52) U.S. Cl.
CPC ...... *G11B 27/031* (2013.01); *G06F 18/23213* (2023.01); *G06V 10/762* (2022.01);
(Continued)

(58) Field of Classification Search
CPC ...... G06V 20/41; G06V 20/49; G06V 40/164; G06V 20/47; G06K 9/6223
See application file for complete search history.

(56) References Cited

U.S. PATENT DOCUMENTS

| 2007/0053660 A1* | 3/2007 | Abe | G06V 40/161 |
| | | | 386/327 |
| 2009/0022362 A1* | 1/2009 | Gagvani | G06T 7/254 |
| | | | 340/541 |

(Continued)

FOREIGN PATENT DOCUMENTS

EP     2 741 293 A1     6/2014

OTHER PUBLICATIONS

MacQueen, J., "Some Methods for Classification and Analysis of Multivariate Observations", Proc. Fifth Berkeley Symp. Math. Statistics and Probability, vol. 1, 1967, pp. 281-296.
(Continued)

*Primary Examiner* — Sunghyoun Park
(74) *Attorney, Agent, or Firm* — Artegis Law Group, LLP (57) ABSTRACT

In various embodiments, a clip application computes a set of appearance values for an appearance metric based on shot sequences associated with a media content item. Each appearance value in the set of appearance values indicates a prevalence of a first character in a different shot sequence associated with the media content item. The clip application then performs one or more clustering operations on the shot sequences based on the set of appearance values to generate a first shot cluster. Subsequently, the clip application generates a clip for the media content item based on the first shot cluster. The clip application transmits the clip to an endpoint device for display. Advantageously, relative to primarily manual approaches, the clip application can more efficiently and reliably generate clips for media content items.

16 Claims, 4 Drawing Sheets

(51) Int. Cl.
    *G06V 10/762*     (2022.01)
    *G06V 20/40*      (2022.01)
    *G06V 40/16*      (2022.01)

(52) U.S. Cl.
    CPC .............. *G06V 20/40* (2022.01); *G06V 20/41* (2022.01); *G06V 20/47* (2022.01); *G06V 20/49* (2022.01); *G06V 40/164* (2022.01); *G06V 40/172* (2022.01)

(56) References Cited

U.S. PATENT DOCUMENTS

| | | |
|---|---|---|
| 2012/0096356 A1 | 4/2012 | Ubillos et al. |
| 2012/0263433 A1 | 10/2012 | Mei et al. |
| 2013/0279810 A1* | 10/2013 | Li .......................... G06V 20/42 382/195 |
| 2013/0343729 A1 | 12/2013 | Rav-Acha et al. |
| 2014/0205158 A1* | 7/2014 | Fukazawa ............. G06F 16/739 382/118 |
| 2014/0328570 A1* | 11/2014 | Cheng ................ H04N 21/8549 386/241 |
| 2014/0375886 A1 | 12/2014 | Galleguillos et al. |
| 2015/0370888 A1* | 12/2015 | Fonseca E Costa ........................ G06F 16/4393 707/738 |
| 2017/0124399 A1* | 5/2017 | Bostick .............. G06V 10/7788 |
| 2018/0174340 A1* | 6/2018 | Shah ........................ G06T 11/60 |
| 2019/0130202 A1 | 5/2019 | Doumbouya et al. |
| 2020/0019759 A1* | 1/2020 | Savchenko .............. G06N 3/08 |
| 2020/0145573 A1* | 5/2020 | Tin ......................... H04N 7/181 |
| 2020/0151585 A1 | 5/2020 | Ishida |
| 2020/0175279 A1* | 6/2020 | Chen .................... G06V 40/167 |
| 2021/0124929 A1 | 4/2021 | Chae |

OTHER PUBLICATIONS

Maneewongvatana et al., "Analysis of Approximate Nearest Neighbor Searching with Clustered Point Sets", Proc. workshop Algorithm Eng. and Experiments {ALENEX '99), Available from: http://ftp.cs.umd.edu-pub/faculty/mount/Papers/dimacs99.ps.gz., arXiv:cs/9901013, Jan. 1999, 20 pages.

Mangasarian, O.L., "Mathematical Programming in Data Mining", Data Mining and Knowledge Discovery, vol. 1, 1997, pp. 183-201.

Matousek, J., "On Approximate Geometric k-Clustering", Discrete and Computational Geometry, DOI: 10.1007=s004540010019, vol. 24, 2000, pp. 61-84.

Moore, Andrew W., "Very Fast EM-Based Mixture Model Clustering Using Multiresolution kd-Trees", Proc. Conf. Neural Information Processing Systems, 1998, pp. 543-549.

Mount et al., "ANN: A Library for Approximate Nearest Neighbor Searching", Proc. Center for Geometric Computing Second Ann. Fall Workshop Computational Geometry, Retrieved from http://www.cs.umd.edu/~mount/ANN on Feb. 25, 2021, 1997, 2 pages.

Ng et al., "Efficient and Effective Clustering Methods for Spatial Data Mining", Proc. 20th Int'l Conf. Very Large Databases, Sep. 1994, pp. 144-155.

Pelleg et al., "Accelerating Exact k-means Algorithms with Geometric Reasoning", Proc. ACM SIGKDD Int'l Conf. Knowledge Discovery and Data Mining, Aug. 1999, pp. 277-281.

Pelleg et al., "X-means: Extending K-means with Efficient Estimation of the Number of Clusters", Proc. 17th Int'l Conf. Machine Learning, Jul. 2000, 8 pages.

Pollard, David, "A Centeral Limit Theorem for k-means Clustering", The Annals of Probability, vol. 10, No. 4, 1982, pp. 919-926.

Preparata et al., "Computational Geometry an Introduction", 1990, 107 pages.

Selim et al., "K-means-type Algorithms: A Generalized Convergence Theorem and Characterization of Local Optimality", IEEE Trans. Pattern Analysis and Machine Intelligence, vol. 6, No. 1, Jan. 1984, pp. 81-87.

Zhang et al., "BIRCH: A New Data Clustering Algorithm and Its Applications", Data Mining and Knowledge Discovery, software available from www.cs.wisc.edu/~vganti/birchcode, vol. 1, No. 2, 1997, pp. 141-182.

Amblard, F., "Which ties to choose? A survey of social networks models for agent-based social simulations", In Proc. of the 2002 SCS International Conference on Artificial Intelligence, Simulation and Planning in High Autonomy Systems, Apr. 2002, pp. 253-258.

Biemann et al., "Language-independent Methods for Compiling Monolingual Lexical Data", Proceedings of CicLING 2004, Seoul, Korea and Springer LNCS 2945, 2004, pp. 215-228.

Bollobas, Bela, "Modern graph theory", vol. 36, No. 3, 1998, pp. 389-390.

Bordag, Stefan, "Word Sense Induction: Triplet-Based Clustering and Automatic Evaluation", Proceedings of EACL-06. Trento, 2006, pp. 137-144.

Biemann et al., "Disentangling from Babylonian Confusion—Unsupervised Language Identification", Proceedings of CICLing-2005, 2005, pp. 762-773.

Dongen, Stijn Van, "A Cluster Algorithm for Graphs" Technical Report INS-R0010, National Research Institute for Mathematics and Computer Science in the Netherlands, May 31, 2000, 40 pages.

Dunning, Ted, "Accurate Methods for the Statistics of Surprise and Coincidence", Computational Linguistics, vol. 19, No. 1, 1993, pp. 61-74.

Ester et al., "A Density-Based Algorithm for Discovering Clusters in Large Spatial Databases with Noise", In Proceedings of the 2nd Int. Conf. on Knowledge Discovery and Datamining (KDD'96), 1996, pp. 226-231.

Dorow et al., "Discovering Corpus-Specific Word Senses", In EACL-2003 Conference Companion (research notes and demos), 2003, pp. 79-82.

Cancho et al., "The small world of human language", Proceedings of The Royal Society of London, Series B, Biological Sciences, doi 10.1098/rspb.2001.1800, vol. 268, No. 1482, 2001, pp. 2261-2265.

Schutze, Hinrich, "Distributional Part-of-Speech Tagging", In EACL 7, 1995, pp. 141-148.

Sima et al., "On the NP-Completeness of Some Graph Cluster Measures", Technical Report cs.CC/0506100, arXiv.org-ePrint archive, 2005, 9 pages.

Stein et al., "On the Nature of Structure and Its Identification", Proceedings of WG'99, LNCS 1665, 1999, pp. 122-134.

Steyvers et al., "The Large-Scale Structure of Semantic Networks:Statistical Analyses and a Model of Semantic Growth", Cognitive Science, vol. 29, No. 1, 2005, pp. 41-78.

Ushioda, Akira, "Hierarchical Clustering of Words and Applications to NLP Tasks", In Proceedings of the Fourth Workshop on Very Large Corpora, 1996, pp. 28-41.

Bak, Duncan J. WattsPer, "Small Worlds: The Dynamics of Networks between Order and Randomness", doi: 10.1063/1.1333299, vol. 53, 1999, 3 pages.

Wu et al., "An Optimal Graph Theoretic Approach to Data Clustering: Theory and Its Application to Image Segmentation", IEEE Transactions on Pattern Analysis and Machine Intelligence, vol. 15, No. 11, Nov. 1993, pp. 1101-1113.

Agarwal et al., "Exact and Approximation Algorithms for Clustering", Proc. Ninth Ann. ACM-SIAM Symp. Discrete Algorithms, DOI: 10.1007=s00453-001-0110-y, vol. 33, 2002, pp. 201-226.

Alsabti et al., "An Efficient K-Means Clustering Algorithm", Proc. First Workshop High Performance Data Mining, Mar. 1998, 6 pages.

Arora et al., "Approximation Schemes for Euclidean k-medians and Related Problems", Proc. 30th Ann. ACM Symp. Theory of Computing, May 1998, pp. 106-113.

Arya et al., "Approximate Range Searching", Computational Geometry: Theory and Applications, vol. 17, 2000, pp. 135-152.

Arya et al., "An Optimal Algorithm for Approximate Nearest Neighbor Searching in Fixed Dimensions", Journal of the ACM, vol. 45, No. 6, Nov. 1998, pp. 891-923.

Bentley, Jon Louis, "Multidimensional Binary Search Trees Used for Associative Searching", Comm. ACM, vol. 18, No. 9, Sep. 1975, pp. 509-517.

(56) References Cited

OTHER PUBLICATIONS

Bottou et al., "Convergence Properties of the K-means Algorithms", Advances in Neural Information Processing Systems 7, 1995, pp. 585-592.

Bradley et al., "Refining Initial Points for K-means Clustering", Proc. 15th Int'l Conf. Machine Learning, 1998, 99 pages.

Bradley et al., "Scaling Clustering Algorithms to Large Databases", Proc. Fourth Int'l Cont. Knowledge Discovery and Data Mining, 1998, pp. 9-15.

Capoyleas et al., "Geometric Clusterings", Journal of Algorithms, vol. 12, 1991, pp. 341-356.

Coggins et al., "A Spatial Filtering Approach to Texture Analysis", Pattern Recognition Letters, vol. 3, May 1985, pp. 195-203.

Dasgupta, Sanjoy, "Learning Mixtures of Gaussians", Proc. 40th IEEE Symp. Foundations of Computer Science, Oct. 1999, pp. 634-644.

Dasgupta et al., "A Two-Round Variant of EM for Gaussian Mixtures", Proc. 16th Conf. Uncertainty in Artificial Intelligence (UAI-2000), Jun. 2000, pp. 152-159.

Du et al., "Centroidal Voronoi Tesselations: Applications and Algorithms", SIAM Review, vol. 41, No. 4, 1999, pp. 537-676.

Duda et al., "Pattern Classification and Scene Analysis", New York: John Wiley & Sons, 1973, 8 pages.

Ester et al., "A Database Interface for Clustering in Large Spatial Databases", Proc. First Int'l Conf.Knowledge Discovery and Data Mining (KDD-95), 1995, pp. 94-99.

Faber, Vance, "Clustering and the Continuous k-means Algorithm", Los Alamos Science, vol. 22, 1994, pp. 138-144.

Fayyad et al., "Advances in Knowledge Discovery and Data Mining", Retrieved from https://mitpress.mil.edu/books/advances-knowledge-discovery-and-data-mining, 1996, 4 pages.

Feller, William, "An Introduction to Probability Theory and Its Applications", vol. 1, 1968, 525 pages.

Forgy, E.W., "Cluster Analysis of Multivariate Data: Efficiency vs Interpretability of Classifications", Biometrics, 21, 1965, 3 pages.

Fukunaga, Keinosuke, "Introduction to Statistical Pattern Recognition", 1990, 616 pages.

Garey et al., "Computers and Intractability: A Guide to the Theory of NP-Completeness", 1979, pp. 90-91.

Gersho et al., "Vector Quantization and Signal Compression", 1992, 732 pages.

Inaba et al., "Experimental Results of Randomized Clustering Algorithm", Proc. 12th Ann. ACM Symp. Computational Geometry, May 1996, pp. C1-C2.

Inaba et al., "Applications of Weighted Voronoi Diagrams and Randomization to Variance-Based k-clustering", Proc. 10th Ann. ACM Symp. Computational Geometry, Jun. 1994, pp. 332-339.

Jain et al., "Algorithms for Clustering Data: A Review", 1988, 334 pages.

Jain et al., "Statistical Pattern Recognition: A Review", IEEE Transactions Pattern Analysis and Machine Intelligence, vol. 22, No. 1, Jan. 2000, pp. 4-37.

Jain et al., "Data Clustering: A Review", ACM Computing Surveys, vol. 31, No. 3, Sep. 1999, pp. 264-323.

Kanungo et al., "Computing Nearest Neighbors for Moving Points and Applications to Clustering", Proc. 10th Ann. ACMSIAM Symp. Discrete Algorithms, Jan. 1999, pp. S931-S932.

Kanungo et al., "The Analysis of a Simple k-means Clustering Algorithm", Technical Report CAR-TR-937, Center for Automation Research, Univ. of Maryland, Jan. 2000, 22 pages.

Kanungo et al., "The Analysis of a Simple k-Means Clustering Algorithm", Proc. 16th Ann. ACM Symp. computational Geometry, Jun. 2000, pp. 100-109.

Kaufman et al., "Finding Groups in Data An Introduction to Cluster Analysis", 1990, 354 pages.

Kohonen, T., "Self-Organization and Associative Memory", 1989, 325 pages.

Kolliopoulos et al., "A Nearly Linear-Time Approximation Scheme for the Euclidean k-median Problem", Proc. Seventh Ann. European Symp. Algorithms, J_ Nesetril, ed., Jul. 1999, pp. 362-371.

Loyd, Stuart P., "Least Squares Quantization in PCM", IEEE Trans. Information Theory, vol. 28, No. 2, Mar. 1982, pp. 129-137.

\* cited by examiner

TECHNIQUES FOR AUTOMATICALLY EXTRACTING COMPELLING PORTIONS OF A MEDIA CONTENT ITEM

CROSS-REFERENCE TO RELATED APPLICATIONS

This application is a continuation of the U.S. patent application titled, "TECHNIQUES FOR AUTOMATICALLY EXTRACTING COMPELLING PORTIONS OF A MEDIA CONTENT ITEM," filed on Nov. 19, 2019, and having Ser. No. 16/689,019. The subject matter of the related application is hereby incorporated herein by reference.

BACKGROUND

Field of the Various Embodiments

Embodiments relate generally to computer science and media processing platforms and, more specifically, to techniques for automatically extracting compelling portions of a media content item.

Description of the Related Art

Most media content providers generate interest in various media content items by using one or more portions of those media content items (referred to herein as "clips") to promote the media content items. Each such clip typically showcases a self-contained and compelling sequence of events. For example, a clip of an episode of a television show could showcase a series of events that ends with a cliffhanger.

In a typical approach to generating one or more clips for a given media content item, an editorial assistant watches the entire media content item to identify the portions of the media content item that are most likely to be of interest to viewers. The editorial assistant then submits the identified portions of the media content item to an editor who, in turn, views, optionally adjusts, and selects which of those identified portions to use as clips.

One drawback of the above approach to generating clips for a media content item is that the above approach requires significant time and manual effort. For example, several hours are usually required to identify and select the portions of a media content item that are to be used as clips. Furthermore, many media content providers have extensive libraries of media content items and are continually generating new media content items. For example, a media streaming provider can have a library that includes thirty thousand existing media content items and can release more than a thousand new media content items each year. Because of resource constraints, many media content providers end up generating clips for only a small fraction of their available media content items.

Another drawback of the above approach to generating clips is that conscious and subconscious subjective criteria are used, at least in part, to identify and select the clips, and subjective criteria are inherently unreliable. In that regard, the subjective criteria used by editorial assistants when identifying and selecting portions of a media content item to use as clips do not necessarily correlate with sequences of events that are likely to pique the interest of a typical viewer. For example, if the editorial assistant watching the media content item has an aversion to the main actor in the media content item, then the editorial assistant may subconsciously avoid selecting compelling sequences of events that feature the main actor. As a result, the resulting clips can have sub-optimal effectiveness.

As the foregoing illustrates, what is needed in the art are more effective techniques for generating clips for media content items.

SUMMARY

One embodiment sets forth a computer-implemented method for identifying and extracting one or more clips from a media content item. The method includes computing a plurality of appearance values for an appearance metric based on a plurality of shot sequences associated with a media content item, where each appearance value included in the plurality of appearance values indicates a prevalence of a first character in a different shot sequence included in the plurality of shot sequences; performing one or more clustering operations on the plurality of shot sequences based on the plurality of appearance values to generate a first shot cluster; generating a clip for the media content based on the first shot cluster; and transmitting the clip to an endpoint device for display.

At least one technical advantage of the disclosed techniques relative to the prior art is that the disclosed techniques can be used to automatically generate clips for media content items in a way that is more efficient and reliable than prior art approaches. In particular, automatically identifying self-contained sequences of events that feature one or more target characters allows more interesting clips to be generated without requiring a person to watch the media content item. Further, the disclosed techniques automatically generate clips based on objective heuristics instead of more subjective criteria, which enhances the reliability and effectiveness of the generated clips. These technical advantages provide one or more technological advancements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one skilled in the art that the inventive concepts may be practiced without one or more of these specific details.

Most media content providers use clips of various media content items to generate interest in those media content items. An effective clip typically showcases a self-contained and compelling portion of the media content item. In a typical approach to generating clips for a given media content item, an editorial assistant watches the entire media content item to identify portions of the media content item that the editorial assistant believes are most likely to be of interest to viewers. An editor subsequently views, optionally adjusts, and selects any number of the identified portions of the media content items for use as clips.

One drawback of the above approach to generating clips is that significant time and manual effort are required to generate the clips for each media content item. Because of resource constraints, many media content providers end up generating clips for only a small fraction of their available media content items. Another drawback of the above approach to generating clips is that each editorial assistant uses, at least in part, different and inherently unreliable conscious and subconscious subjective criteria to identify portions of media content items to use as clips. As a result, each clip can reflect individual preferences that do not necessarily match the preferences of a typical viewer. The capacity of the clips to simulate interest in the associated media content items can therefore be sub-optimal.

With the disclosed techniques, however, a clip application automatically determines clips that highlight interesting and self-contained sequences of events based on the appearances of any number of target character throughout the media content item. The clip application uses a shot detector to partition the media content into shot sequences, where each shot sequence typically includes a different set of frames captured continuously from a given camera or point of capture. If reference images for the target characters are provided to the clip application, then the clip application uses a face recognition engine to determine, for each shot sequence, the "frame" percentage of frames within the shot sequence that include each target character. Otherwise, the clip application uses a face detection/clustering engine to set the target characters equal to the most prevalent characters in the media content item and to determine, for each shot sequence the frame percentages.

Subsequently, the clip application selects a clip recipe from any number of predetermined clip recipes based on the recipe ID. Each of the clip recipes specifies a different set of heuristics for determining clips based on frame percentages. As per the selected clip recipe, the clip application performs clustering operations on one or more timelines of the shot sequences based on the frame percentages to generate any number of shot clusters. Each shot cluster includes any number of temporally sequential shot sequences that are grouped based on similarities in the frame percentages of a target character or a pair of target characters. Based on the selected clip recipe, the clip application converts any number of the shot clusters to clips, selecting the start position and end position of each clip to optimize the effectiveness of the clip. The clip application performs any number and type of filtering and ranking operations on the clips to determine the most promising clips and then transmits the most promising clips to an endpoint device for display.

At least one technical advantage of the disclosed techniques relative to the prior art is that the clip application can be used to more efficiently and reliably generate clips for media content items. In particular, because the clip application automatically determines self-contained and interesting sequences of events that feature any number of target characters, the time and manual effort to generate effective clips can be reduced. Accordingly, for a typical media content provider that has limited resources, the clip application enables the media content provider to generate clips for more media content items. Furthermore, because the clip application determines clips using clip recipes that encapsulate objective heuristics instead of subjective criteria, both the reliability and effectiveness of the resulting clips can be increased. These technical advantages provide one or more technological advancements over the prior art approaches.

System Overview

Figure 1:
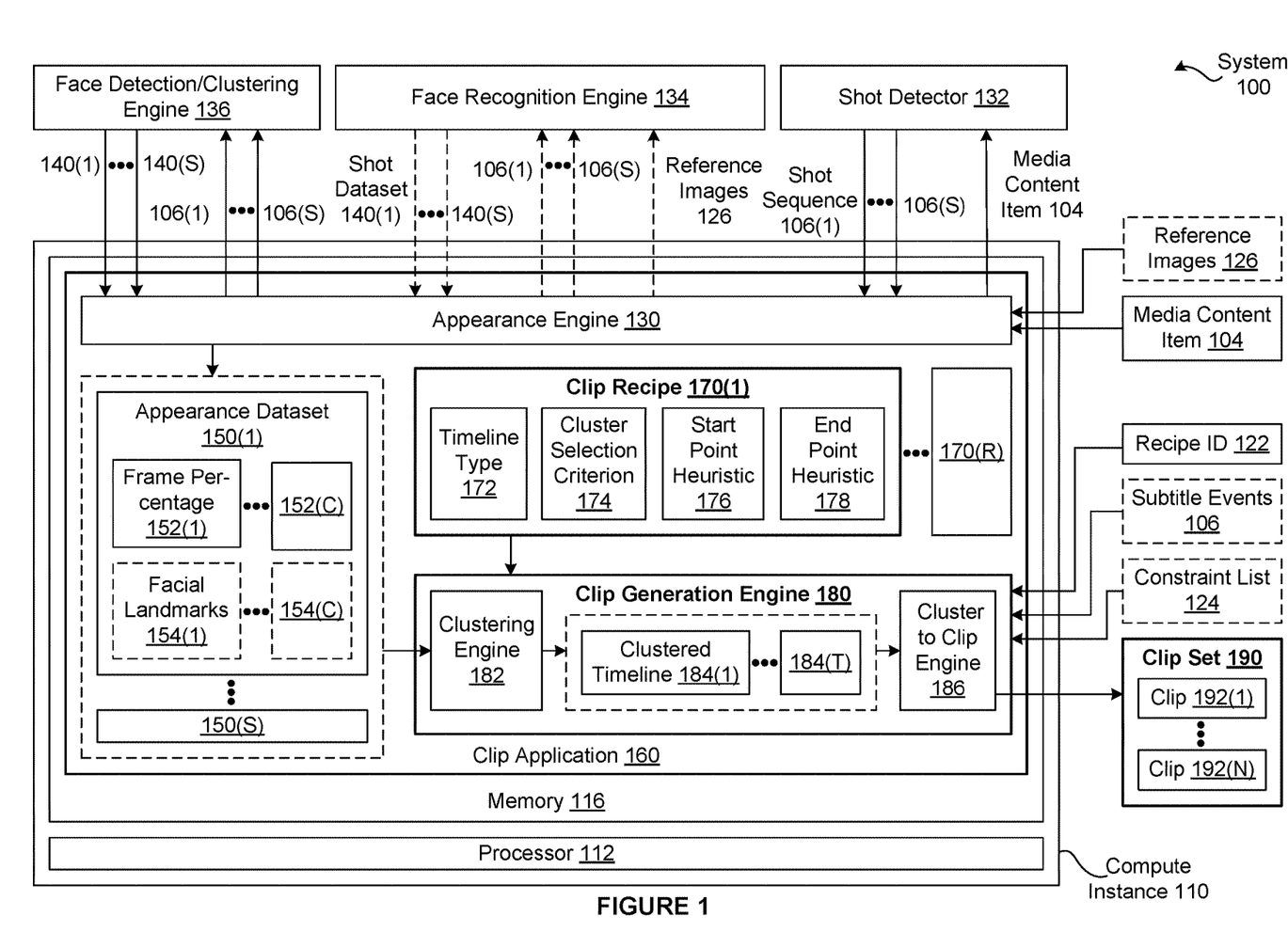
FIG. 1 is a conceptual illustration of a system configured to implement one or more aspects of the various embodiments.

FIG. 1 is a conceptual illustration of a system 100 configured to implement one or more aspects of the various embodiments. The system 100 includes, without limitation, a compute instance 110, a shot detector 132, a face recognition engine 134, and a face detection/clustering engine 136. For explanatory purposes, multiple instances of like objects are denoted with reference numbers identifying the object and parenthetical alphanumeric characters identifying the instance where needed.

Any number of the components of the system 100 may be distributed across multiple geographic locations or implemented in one or more cloud computing environments (i.e., encapsulated shared resources, software, data, etc.) in any combination. In alternate embodiments, the system 100 may omit any number of the shot detector 132, the face recognition engine 134, and the face detection/clustering engine 136. In various embodiments, the system 100 may include any number of compute instances 110 in any combination.

As shown, the compute instance 110 includes, without limitation, a processor 112 and a memory 116. The processor 112 may be any instruction execution system, apparatus, or device capable of executing instructions. For example, the processor 112 could comprise a central processing unit ("CPU"), a graphics processing unit ("CPU"), a controller, a micro-controller, a state machine, or any combination thereof. The memory 116 stores content, such as software applications and data, for use by the processor 112 of the compute instance 110. In alternate embodiments, each of any number of compute instances 110 may include any number of processors 112 and any number of memories 116 in any combination. In particular, any number of the compute instances 110 (including one) may provide a multiprocessing environment in any technically feasible fashion.

The memory 116 may be one or more of a readily available memory, such as random access memory ("RAM"), read only memory ("ROM"), floppy disk, hard disk, or any other form of digital storage, local or remote. In some embodiments, a storage (not shown) may supplement or replace the memory 116. The storage may include any number and type of external memories that are accessible to the processor 112. For example, and without limitation, the storage may include a Secure Digital Card, an external Flash memory, a portable compact disc read-only memory (CD-ROM), an optical storage device, a magnetic storage device, or any suitable combination of the foregoing.

The compute instance 110 is configured to implement one or more applications or subsystems of applications. For explanatory purposes only, each application is depicted as residing in the memory 116 of a single compute instance 110 and executing on a processor 112 of the single compute instance 110. However, in alternate embodiments, the functionality of each application may be distributed across any number of other applications that reside in the memories 116 of any number of compute instances 110 and execute on the processors 112 of any number of compute instances 110 in any combination. Further, the functionality of any number of applications or subsystems may be consolidated into a single application or subsystem.

In particular, the compute instance 110 is configured to implement application(s) that determine any number of clips 192 for a media content item 104. The media content item 104 includes, without limitation, any amount of visual content and any amount (including none) of audio content. For example, the media content item 104 could be a feature-length movie, an episode of a television show, an audiovisual clip, a podcast, and so forth. Each of the clips 192 specifies a different portion of the media content item 104 that preferably includes a self-contained and compelling sequence of events.

As described previously herein, a typical conventional approach to generating clips for the media content item 104 is primarily manual and requires a person (e.g., an editorial assistant) to watch the entire media content item 104. One drawback of this type of conventional approach to generating clips is that a substantial amount of time and manual effort is required to generate the clips for each media content item 104. Another drawback of this type of conventional approach to generating clips is that the resulting "conventional" clips are determined based, at least in part, on inherently unreliable subjective criteria. As a result, the effectiveness of the conventional clips can be sub-optimal.

Generating Compelling Clips of a Media Content Item

To more efficiently and reliably determine effective clips 192 for the media content item 104, the compute instance 110 implements a clip application 160 that automatically generates the clips 192 based on when different target characters appear in the media content item 104. The clip application 160 resides in the memory 116 and executes on the processor 112. As shown, the clip application 160 includes, without limitation, an appearance engine 130, any number of appearance datasets 150, any number of clip recipes 170, and a clip generation engine 180.

Upon receiving the media content item 104, the appearance engine 130 transmits the media content item 104 to the shot detector 132. The shot detector 132 executes any number of shot detection algorithms to partition the media content item 104 into shots sequences 106(1)-106(S), where S is equal to the total number of shot sequences 106 included in the media content item 104. Each shot sequence 106 includes a set of frames that usually have similar spatial-temporal properties and run for an uninterrupted period of time. For instance, in some embodiments, each shot sequence 106 includes frames captured continuously from a given camera or point of capture.

For each shot sequence 106(x), where x is an integer between 1 and S, the appearance engine 130 determines a shot dataset 140(x) that indicates which of the target characters appear in each frame in the shot dataset 140(x). In alternate embodiments, instead of indicating which of the target characters appear in each frame in the shot sequence 106(x), the shot dataset 140(x) may specify a total number or percentage of the frames within the shot sequence 106(x) that include each of the target characters. In the same or other alternate embodiments, the shot dataset 140(x) may indicate any amount of additional data at any level of granularity. For instance, in some embodiments, the shot dataset 140(x) includes additional per frame information describing facial landmarks associated with the target characters. A facial landmark specifies any amount of information that may represent the position of any region of the face, such as the lips.

The appearance engine 130 may generate the shot datasets 140 in any technically feasible fashion. In some embodiments, the appearance 130 engine configures either the face recognition engine 134 or the face detection/clustering engine 136 to generate the shot datasets 140 based on whether the appearance engine 130 acquires reference images 136 (depicted with a dotted box) that define the target characters.

The reference images 126 include, without limitation, at least one representative image for each of C target characters, where C may be any positive integer. For instance, in some embodiments, the reference images 126 include a different headshot for each of the ten main characters associated with the media content item 104. The clip application 160 or the appearance engine 130 may acquire the reference images 126 in any technically feasible fashion. For instance, in some embodiments, the reference images 126 are provided to the clip application 160 via a graphical user interface ("GUI"), not shown.

As depicted with dotted lines, if the appearance engine 130 acquires the reference images 126, then the appearance engine 130 configures the face recognition engine 134 to generate the shot datasets. Concurrently, for each shot sequence 106(x), the appearance engine 130 configures a different instance of the face recognition engine 134(x) to perform any number and type of face recognition operations on the shot sequence 106(x) based on the reference images 126 to generate the shot dataset 134(x). In alternate embodiments, the appearance engine 130 may configure any number of instances the face recognition engine 134 to process the shot sequences 106 sequentially, concurrently, or any combination thereof.

If, however, the appearance engine 130 does not acquire the reference images 126, then the appearance engine 130 configures the face detection/clustering engine 136 to generate the shot datasets 134. The appearance engine 130 transmits the shot sequences 106 to the face detection/clustering engine 136. Concurrently, for each shot sequence 106(x), the face detection/clustering engine 136 configures a different instance of a face detection engine (not shown) to perform any number and type of face detection operations on the shot sequence 106(x) to generate an associated face detection dataset (not shown). Each face detection dataset specifies appearance data for any number of inferred characters (e.g., character 1, character 2, etc.). In alternate embodiments, the face detection/clustering engine 136 may configure any number of instances of the face detection engine to process the shot sequences 106 sequentially, concurrently, or any combination thereof.

Subsequently, the face detection/clustering engine 136 executes an unsupervised clustering algorithm on the character detection datasets to determine the main characters (i.e., the characters that are the most prevalent within the media content item 104). The face detection/clustering engine 136 may implement any type of unsupervised clustering algorithm and determine any number of main characters. For instance, in some embodiments, the face detection/clustering engine 136 executes a randomized graph-clustering algorithm, such as a Chinese whisper algorithm, on the character detection datasets to generate character clusters. In general, each character cluster represents a single character and the size of the cluster indicates the prevalence of the character within the media content item 104.

To facilitate generating the clips 192 that feature the main characters, the face detection/clustering engine 136 assigns the C largest character clusters to represent C target (and main) characters, where C is the total number of target characters. Subsequently, the face detection/clustering engine 136 generates the shot datasets 140 based on the character clusters representing the target characters. The number of target characters may be specified in any technically feasible fashion. For instance, in some embodiments, the face detection/clustering engine 136 determines the number of target characters based on user input received via a GUI. In other embodiments, the face detection/clustering engine 136 computes the number of target characters based on the playback length of the media content item 104.

Irrespective of whether the appearance engine 130 obtains the shot datasets 140 from the face recognition engine 134 or the face detection/clustering engine 136, the appearance engine 130 converts the shot datasets 140 into the appearance datasets 150. More precisely, for each of the shot sequences 106(x), the appearance engine 130 converts the shot dataset 140(x) into the appearance dataset 150(x). As shown, each of the appearance datasets 150 includes, without limitation, frame percentages 152(1)-152(C), where C is the total number of target characters. Each of the frame percentages 152 included in the appearance dataset 150(x) specifies a percentage (from 0% to 100%) of the frames included in the shot sequence 106(x) in which a different target character appears. For example, if a fifth target character is Anne, then the appearance dataset 150(1) includes the frame percentage 152(5) that specifies the percentage of the frames in the shot sequence 106(1) in which Anne appears.

The appearance engine 130 may perform any number and type of operations on the shot dataset 140(x) to generate the appearance dataset 150(x). For instance, in some embodiments, the shot dataset 140(x) specifies which characters appear in each frame. To generate the frame percentage 152(1) in the appearance dataset 150(x), the appearance engine 130 divides the number of frames in the shot sequence 106(x) in which the first target character appears by the total number of frames in the shot sequence 106(x).

In alternate embodiments, the appearance dataset 150(x) may include any amount and type of additional information that is associated with the appearances of the target characters in the shot sequence 106(x). For instance and as depicted with dotted boxes, in some embodiments, the appearance dataset 150(x) additionally includes facial landmarks 154(1)-154(C). Each facial landmarks 154 may specify any amount and type of information representing the position of any region of the face, such as lips, of the associated target character for any number of frames. In the same or other alternate embodiments, the appearance engine 130 may determine (e.g., generate or acquire) the target characters and the appearance datasets 150 in any technically feasible fashion.

As shown, the clip generation engine 180 includes, without limitation, a clustering engine 182, any number of clustered timelines 184, and a cluster to clip engine 186. The clip generation engine 180 generates any number of clips 192 based on the appearance datasets 150 and the clip recipe 170 specified by a recipe ID 122. The clip application 130 or the chip generation engine 180 may obtain the recipe ID 122 in any technically feasible fashion. For instance, in some embodiments, the clip application 130 or the clip generation engine 180 determines the recipe ID 122 based on user input received via a GUI and then selects the clip recipe 170 that corresponds to the recipe ID 122. The recipe ID 122 may specify one of any number of clip recipes 170 in any technically feasible fashion. For explanatory purposes only, the clip recipe 170 specified by the recipe ID 122 is also referred to herein as the "specified clip recipe 170."

Each of the clip recipes 170 describes a different set of heuristics that the clip generation engine 180 is to use to determine the clips 192. Because each of the clip recipes 170 causes the clip generation engine 180 to implement a different set of heuristics, the recipe ID 122 may be selected based on a target goal (e.g., highlighting the main actors, attracting new viewers to a television series, retaining existing viewers of a television series, highlighting season-ending cliffhanger(s), etc.).

As shown, each of the clip recipes 170 includes, without limitation, a timeline type 172, a cluster selection criterion 174, a start point heuristic 176, and an end point heuristic 178. The timeline type 172 indicates the type of the clustered timeline(s) 184 that the clustering engine 182 is to generate. Each of the clustered timelines 184 includes, without limitation, any number of shot clusters (not shown in FIG. 1), where each shot cluster includes one or more temporally sequential shot sequences 106. Note that within the clustered timeline 184(x), the clustering engine 182 may assign each shot sequence 106 to at most one of the shot clusters. In alternate embodiments, each of the clip recipes 170 may specify a different set of heuristics in any technically feasible fashion and the functionality of the clip generation engine 180 is modified accordingly.

For example, within the clustered timeline 184(1), the clustering engine 182 could assign the shot sequences 106(21)-106(52) to a first shot cluster, the shot sequences 106(136)-106(159) to a second shot cluster, and the remaining shot sequences 106 to none of the shot clusters. Each of the clustered timelines 184 may include a different number of shot clusters and each of the shot clusters may include a different number of shot sequences 106. The clustering engine 182 may execute any number (including zero) and type of pre-clustering operations, any number and type of clustering algorithms, and any number (including zero) and type of post-clustering operation to generate the clustered timelines 184.

For instance, in some embodiments, the specified clip recipe 170 includes the timeline type 172 of "character." The timeline type 172 of character indicates that the clustering engine 182 is to generate a different character clustered timeline 184 for each of the C target characters. To generate the character clustered timeline 184(x), where x is between 1 and C, the clustering engine 182 executes a k-means clustering algorithm on the shot sequences 106(1)-106(S) based on the frame percentages 152(x) included in the appearance datasets 150(1)-150(S). An example of a k-means clustering algorithm is a filtering algorithm that is an efficient implementation of Lloyd's algorithm. In general, the clustering engine 182 may execute any number and type of clustering algorithm(s) in any technically feasible fashion to generate the clustered timelines 184 that reflect the timeline type 172. In alternate embodiments, the clustering engine 182 may perform post-clustering filtering operations on the clustered timelines 184 to remove shot clusters that include less than a minimum threshold of shot sequences 106 (e.g., less than two shot sequences 106).

For each of the clustered timelines 184, the cluster to clip engine 186 selects any number of the shot clusters based on the cluster selection criterion 174 and any amount and type of additional data (e.g., data included in the appearance datasets 150). For instance, in some embodiments, the specified clip recipe 170 includes the cluster selection criterion 174 of "first shot cluster with respect to playback time." As per the cluster selection criterion 174, the cluster to chip engine 186 selects the first shot cluster in each of the clustered timelines 184.

In other embodiments, the specified clip recipe 170 includes the cluster selection criterion 174 of "the shot cluster in which the associated target character first appears while there is dialog." To properly apply the cluster selection criterion 174, the cluster to clip engine 186 may acquire subtitle events 106 (depicted using a dotted box). Each subtitle event 106 indicates the timing and a textual description of one or more verbal events that are associated with the media content item 104.

In yet other embodiments, the specified clip recipe 170 is used to determine clips 192 from which to extract still frames for use in artwork and includes the cluster selection criterion 174 of "the first shot cluster in which the associated target character 184 appears but does not speak." To properly apply the cluster selection criterion 174, the cluster to clip engine 186 may analyze the facial landmarks 154 of the face of the target character during the shot sequences 106 in the shot clusters to predict whether the target character is speaking. For example, the cluster to clip engine 186 could determine whether the target character is speaking based on the distance between the lips of the target character in the different frames.

For each selected shot cluster, the cluster to clip engine 186 generates a different clip 192 based on the start point heuristic 176 and the end point heuristic 178 included in the selected clip recipe 170. Each of the clips 192 specifies a different portion of the media content item 104 in any technically feasible fashion. For instance, in some embodiments, each of the clips 192 includes, without limitation, a start position with respect to the media content item 104 and an end position with respect to the media content item 104. In other embodiments, each of the clips 192 includes, without limitation, a different temporally sequential subset of the frames in the media content item 104.

For each of the selected shot clusters, the start heuristic 176 and the end heuristic 178 specify how the cluster to clip engine 186 is to determine, respectively, the start position and the end position of the associated clip 192. For instance, in some embodiments, the specified clip recipe 170 includes the start position heuristic 176 of "the first frame in the first shot sequence 106 in which the associated target character first appears." In the same or other embodiments, the specified clip recipe 170 includes the end position heuristic 178 of "the last frame in the shot cluster."

After the cluster to clip engine 186 generates the clips 192, the cluster to clip engine 186 performs any number (including zero) of filtering and any number (including zero) of ranking operations on the clips 192 to generate a clip set 190. The clip set 190 includes, without limitation, any number of the clips 192. The cluster to clip engine 186 may perform filtering and/or ranking operations on the clips 192 based on any number of criteria and/or constraints in any technically feasible fashion. For instance, as depicted with a dotted box, in some embodiments, the cluster to clip engine 186 performs filtering operations on the clips 192 based on a constraint list 124. The constraint list 124 may specify any number and type of constraints in any technically feasible fashion.

After generating the clip set 190, the cluster to clip engine 186 transmits the clip set 190 and/or any number of the clips 192 included in the clip set 190 to any number of endpoint devices for display. Examples of endpoint devices include, without limitation, laptop computers, tablets, smartphones, game consoles, etc. In alternate embodiments, the cluster to clip engine 186 may transmit any number of the clips 192 included in the clips set 190 to any number of software applications that execute on any number of endpoint devices. For instance, in some embodiments, the cluster to clip engine 186 may transmit the clip set 190 to a clip editing engine (not shown). The clip editing engine may include a GUI with which an editor may view, adjust, and select any number of the clips 192 included in the clip set 190. In alternate embodiments, the cluster to clip engine 186 may perform any number of additional operations on the clip set 190 and/or display the clip set 190 to a user (e.g., an editor) in addition to or instead of transmitting the clip set 190 to software application(s).

Advantageously, because the clip application 160 automatically determines the clip set 190, the amount of time and manual effort required to generate clips 192 that effectively generate interest in the media content item 104 is reduced compared to primarily manual conventional techniques. In particular, the clip application 190 eliminates the need for a person (e.g., an assistant editor) to view the entire media content item 104 in an attempt to manually identify compelling sequences of events. Furthermore, because the clip application 190 uses objective heuristics to determine the clip set 190 instead of more subjective criteria, the effectiveness and reliability of the clips 192 can be increased. And because the clip application 160 provides a wide range of configuration mechanisms (e.g., the reference images 126, the recipe ID 122, the subtitle events 106, the constraint list 124, ranking criteria, etc.), the clip set 190 can be targeted to achieve a wide variety of goals.

In alternate embodiments, multiple clip sets 190 may be generated for a single media content item 104. For example, the clip set 190(1) could be generated with the reference images 126(1) of characters that are popular with viewers aged 18-25, and the clip set 190(2) could be generated with the reference images 126(2) of characters that are popular with viewers aged 26-49. In the same or other embodiments, different clip sets 190 may be generated using different recipe IDs 122, different constraint lists 124, and/or different ranking criteria to achieve different goals.

It will be appreciated that the system shown herein is illustrative and that variations and modifications are possible. The connection topology, including the location and arrangement of the clip application 160, the shot detector 132, the face recognition engine 134, the face detection/clustering engine 136, the appearance engine 130, the appearance datasets 150, the clip recipes 170, and the clip generation engine 180 may be modified as desired. In certain embodiments, one or more components shown in FIG. 1 may not be present.

Note that the techniques described herein are illustrative rather than restrictive, and may be altered without departing from the broader spirit and scope of the embodiments. Many modifications and variations will be apparent to those of ordinary skill in the art without departing from the scope and spirit of the described embodiments and techniques. Further, in various embodiments, any number of the techniques disclosed herein may be implemented while other techniques may be omitted in any technically feasible fashion.

Generating Different Types of Clips Based on Different Clip Recipes

Figure 2:
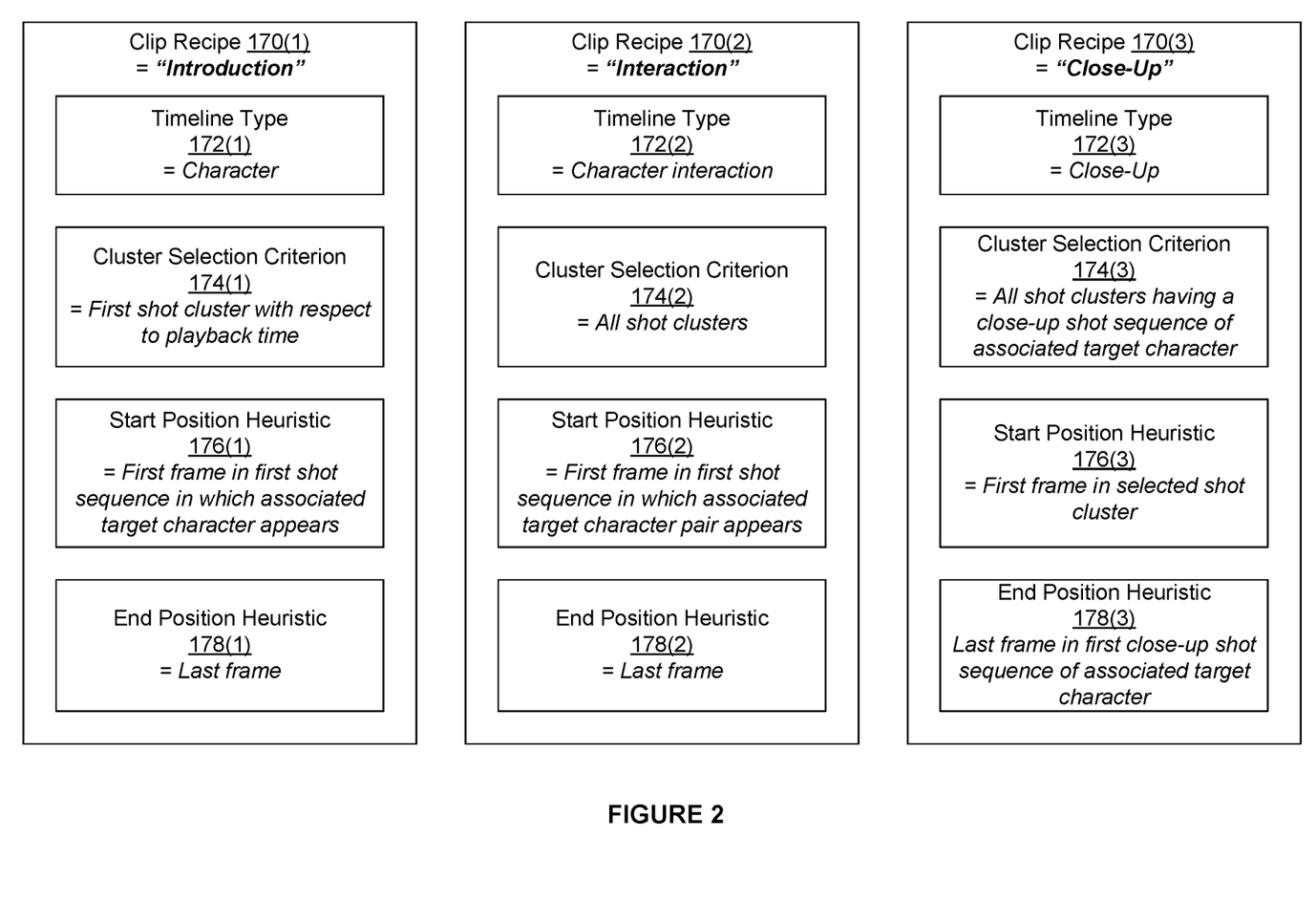
FIG. 2 sets forth exemplary illustrations of the clip recipes of FIG. 1, according to various embodiments.

FIG. 2 sets forth exemplary illustrations of the clip recipes 170 of FIG. 1, according to various embodiments. In general, each of the chip recipes 170 describes heuristics that the clip generation engine 180 can use to generate clips 192 that are likely to showcase self-contained and compelling sequences of events in media content items 104. More precisely, the timeline type 172, the cluster selection criterion 174, the start position heuristic 176, and the end position heuristic 178 included in a given clip recipe 170 specify how the clip generation engine 180 is to generate clips 192 based on a set of objective criteria.

The clip recipe 170(1) describes heuristics that can be used to generate "introduction" clips 192 in which target characters first appear in the media content item 104. As shown, the clip recipe 170(1) includes, without limitation, the timeline type 172(1), the cluster selection criterion 174(1), the start position heuristic 176(1), and the end position heuristic 178(1). As described previously herein in conjunction with FIG. 1, the timeline type 172(1) of "character" indicates that the clustering engine 182 included in the clip generation engine 180 is to generate a different clustered timeline 184 for each of the target characters.

The cluster selection criterion 174(1) of "first shot cluster with respect to playback time" indicates that the cluster to clip engine 186 is to select the first shot cluster with respect to playback time in each of the clustered timelines 184. The start position heuristic 176(1) of "first frame in the first shot sequence 106 in which associated target character appears" and the end position heuristic 178(1) of "last frame" specify how the cluster to clip engine 186 is to generate a new clip 192 for each selected shot cluster.

When applying the clip recipe 170(1), for each selected shot cluster, the cluster to clip engine 186 generates a new clip 192 that extends from, inclusively, the first frame in the first shot sequence 106 of the selected shot cluster in which the associated target character appears through the last frame in the selected shot cluster. Because each of the new clips 192 includes one or more complete shot sequences 106 and no incomplete shot sequences 106, the likelihood that each new clip 192 represents a self-contained sequence of events in which a target character is introduced (with respect to the media content item 104) is increased.

The clip recipe 170(2) describes heuristics that can be used to generate "interaction" clips 192 in which two target characters appear together in the media content item 104. As shown, the clip recipe 170(2) includes, without limitation, the timeline type 172(2), the cluster selection criterion 174(2), the start position heuristic 176(2), and the end position heuristic 178(2). The timeline type 172(2) of "character interaction" indicates that the clustering engine 182 included in the clip generation engine 180 is to generate a different clustered timeline 184 for each of any number of target character pairs.

The clustering engine 182 may determine the target character pairs in any technically feasible fashion. For instance, in some embodiments, the clustering engine 182 computes an interaction score for each pair of target characters based on an interaction function. Accordingly, for C target characters, the clustering engine 182 computes C(C-1)/2 interaction scores. For the pair of target characters c1 and c2, the interaction function takes into account how frequently the target character c1 appears, how frequently the target character c2 appears, and how frequently the target characters c1 and c2 appear together in the media content item 104. The clustering engine 182 then picks the N highest-scoring pairs of target characters as the target character pairs, where N is a total number of target character pairs. The clustering engine 182 may determine the total number of target character pairs in any technically feasible fashion (e.g., based on user input received via a GUI).

The cluster selection criterion 174(2) of "all shot clusters" indicates that the cluster to clip engine 186 is to select all the shot clusters in all of the clustered timelines 184. The start position heuristic 176(2) of "first frame in first shot sequence 106 in which associated target character pair appears" and the end position heuristic 178(2) of "last frame" specify how the cluster to clip engine 186 is to generate a new clip 192 for each selected shot cluster.

When applying the clip recipe 170(2), for each selected shot cluster, the cluster to clip engine 186 generates a new clip 192 that extends from, inclusively, the first frame in the first shot sequence 106 of the selected shot cluster in which the associated target character pair appears through the last frame in the selected shot cluster. Because each of the new clips 192 includes one or more complete shot sequences 106 and no incomplete shot sequences 106, the likelihood that each new clip 192 represents a self-contained sequence of events in which a target character pair interacts is increased.

The clip recipe 170(3) describes heuristics that can be used to generate "close-up" clips 192 that include, without limitation, a close-up shot sequence 106 of a target character in the media content item 104. As shown, the clip recipe 170(3) includes, without limitation, the timeline type 172(3), the cluster selection criterion 174(3), the start position heuristic 176(3), and the end position heuristic 178(3). The timeline type 172(3) of "character" indicates that the clustering engine 182 included in the clip generation engine 180 is to generate a different clustered timeline 184 for each target character.

The cluster selection criterion 174(2) of "all shot clusters having a close-up shot sequence 106" indicates that, for all of the clustered timelines 184, the cluster to clip engine 186 is to select all of the shot clusters that include at least one "close-up shot sequence 106." As referred to herein, a close-up shot sequence 106 includes, without limitation, at least one frame that shows a close-up of the face of the associated target character. The cluster to clip engine 186 may determine whether a shot sequence 106 is a close-up shot sequence 106 in any technically feasible fashion.

For instance, in some embodiments, for each of the frames in the shot sequence 106, the cluster to clip engine 186 determines the relative positioning of the face of the target character and the height of the face based on the facial landmarks 154. If, for any of the frames in the shot sequence 106, the target character is facing towards the screen and the ratio of the height of the face to the height of the screen is greater than a close-up threshold, then the cluster-to clip engine 186 determines that the shot sequence 106 is a close-up shot sequence 106.

The start position heuristic 176(3) of "first frame in selected shot cluster" and the end position heuristic 178(3) of "last frame in the first close-up shot sequence 106 of the associated target character" specify how the cluster to clip engine 186 is to generate a new clip 192 for each selected shot cluster. When applying the clip recipe 170(3), for each selected shot cluster, the cluster to clip engine 186 generates a new clip 192 that extends from, inclusively, the first frame in the selected shot cluster through the last frame in the first close-up shot sequence 106 of associated target character.

Because each of the new clips 192 includes one or more complete shot sequences 106 and no incomplete shot sequences 106, the likelihood that each new clip 192 represents a self-contained sequence of events that includes a close-up view of a target character is increased. Notably, a close-up view of a character is often used to capture emotions as a precursor to a cliffhanger or other type of interesting moment. Consequently, ending each new clip 192 immediately after the first close-up shot sequence 106 may increase the effectiveness of the new clips 192.

Advantageously, a user (e.g., an editorial assistant or an editor) may set the recipe ID 122 to specify the clip recipe 170 that is most likely to achieve a target goal. For instance, if the target goal is to showcase the main actors, then the user may set the recipe ID 122 to specify the introduction clip recipe 170(1). If, however, the target goal is to showcase interactions between main actors, then the user may set the recipe ID 122 to specify the interaction clip recipe 170(2). Alternatively, if the target goal is to highlight cliffhangers, then the user may select the recipe ID 122 to specify the close-up clip recipe 170(3).

Figure 3:
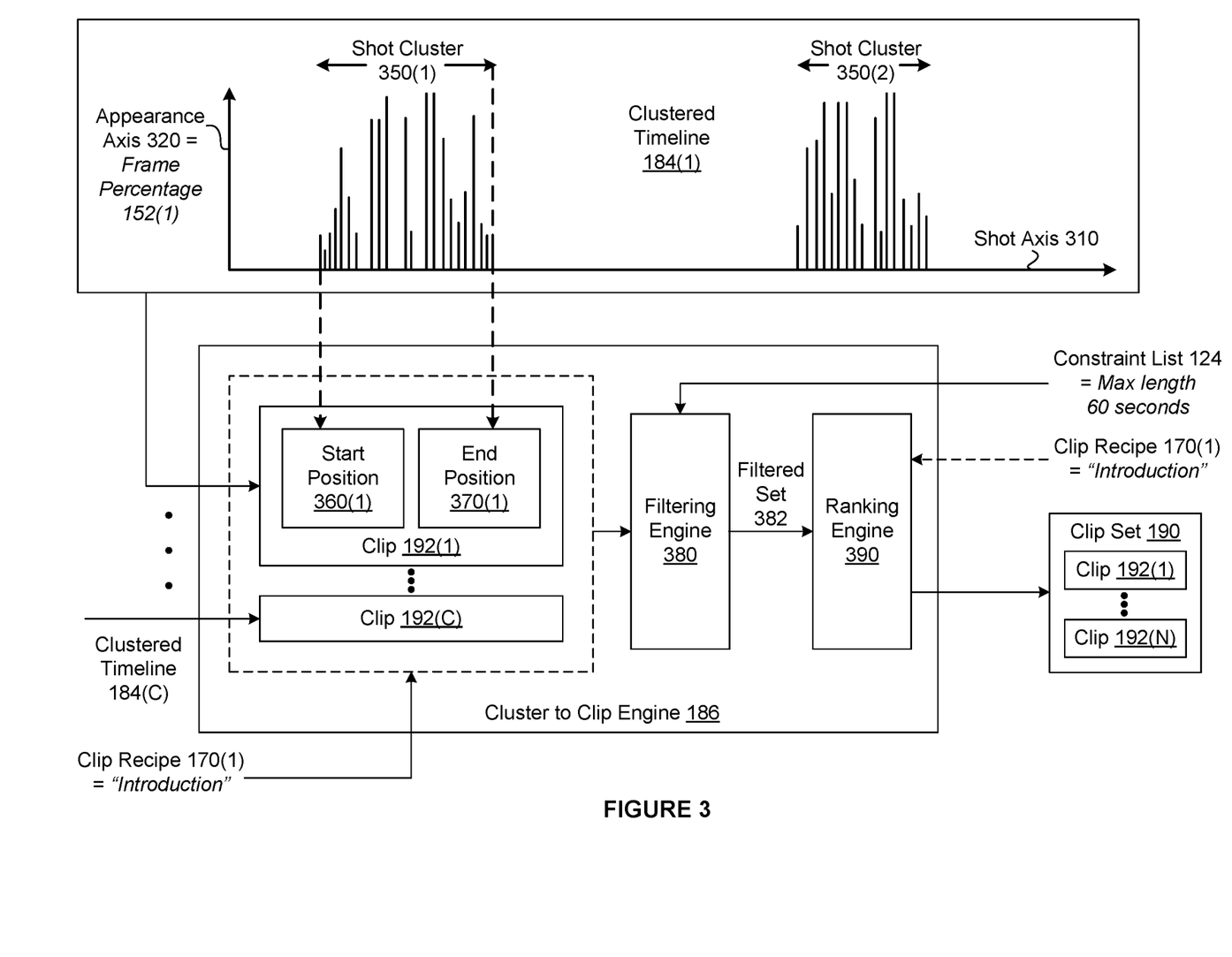
FIG. 3 is a more detailed illustration of the cluster to clip engine of FIG. 1, according to various embodiments.

FIG. 3 is a more detailed illustration of the cluster to clip engine 186 of FIG. 1, according to various embodiments. For explanatory purposes only, FIG. 3 illustrates an embodiment in which the recipe ID 122 specifies the "introduction" clip recipe 170(1) of FIG. 2, and the clip generation engine 180 generates the clustered timelines 184(1)-184(C) for a total of C target characters based on the timeline type 172(1) of "character."

The clustered timeline 184(1) associated with a first target character is depicted with respect to a shot axis 310 and an appearance axis 320. The shot axis represents the shot sequence 106(x) to the shot sequence 106(S) and the appearance axis 320 represents the frame percentages 152(1) associated with the first target character and the different shot sequences 106(x). Each shot sequence 106(x) in which the first target character appears at least once is depicted as a vertical line. The horizontal position of the vertical line corresponds to the relative temporal ordering of the shot sequence 106(x) and the height of the vertical line represents the frame percentage 152(1) included in the appearance dataset 150(x). As described previously herein, the frame percentage 152(1) for the shot sequence 106(x), is the percentage of frames within the shot sequence 106(x) that include the first target character.

As shown, the clip generation engine 180 assigns a first temporally sequential subset of the shot sequences 106 to a shot cluster 350(1), a second temporally sequential subset of the shot sequences 106 to the shot cluster 350(2), and does not assign the remaining shot sequences 106 to any shot clusters 350. Consequently, the clustered timeline 184(1) includes, without limitation, the shot clusters 350(1) and 380(2). Although not depicted, each of the clustered timelines 184(2)-184(C) may include a different number of shot clusters 350.

As shown, the cluster to clip engine 186 includes, without limitation, the clips 192(1)-192(C), a filtering engine 380, and a ranking engine 390. In alternate embodiments, the total number of clips 192 included in the cluster to clip engine 186 may vary based on any number of criteria, such as the media content item 104 and the clip recipe 170 specified by the recipe ID 122. In the same or other alternate embodiments, the filtering engine 380 and/or the ranking engine 390 may be omitted from the cluster to clip engine 186, and the cluster to clip engine 186 may determine which of the clips 192 to include in the clip set 190 in any technically feasible fashion.

In operation, the cluster to clip engine 186 generates the clips 192 based on the clustered timelines 184 and the "introduction" clip recipe 170(1) of FIG. 2. More specifically, the cluster to clip engine 186 generates the clips 192 based on the clustered timelines 184, the cluster selection criterion 174(1) of "first shot cluster 350 with respect to playback time," the start position heuristic 176(1) of "first frame in the first shot sequence 106 in which associated target character appears" and the end position heuristic 178(1) of "last frame." Accordingly, the cluster to clip engine 186 generates the clip 192(1)-192(C) based on, respectively, the clustered timelines 184(1)-184(C).

As shown, each of the clips 192 includes, without limitation, a start position 360 and an end position 370. Each of the start position 360 and the end position 370 may specify a position in the media content item 104 in any technically feasible fashion. For instance, in some embodiments, the start position 360 and the end position 370 specify playback times that are associated with the media content item 104. In other embodiments, the start position 360 and the end position 370 specify frames in the media content item 104. In alternate embodiments, each of the clips 192 may specify a different portion of the media content item 104 in any technicality feasible fashion. For instance, in some embodiments, each of the clips 192 includes, without limitation, a different temporally sequential subset of the frames in the media content item 104.

For explanatory purposes only, a mapping of the clustered timeline 184(1) associated with a first target character to the clip 192(1) is depicted via dotted lines. To generate the clip 192(1), the cluster to clip engine 186 selects the shot cluster 350(1) included in the clustered timeline 184(1). The cluster to clip engine 196 determines that the first shot sequence 106 in the shot cluster 350(1) in which the first target character appears is also the first shot sequence 106 in the shot cluster 350(1). Therefore, the cluster to clip engine 186 sets the start position 360(1) included in the clip 192(1) to specify the position of the first frame in the shot cluster 350(1). The cluster to clip engine 186 then sets the end position 370(1) included in the clip 192(1) to specify the position of the last frame in the shot cluster 350(1).

After the cluster to clip engine 186 generates the clips 192, the filtering engine 380 performs filtering operations on the clips 192 based on the constraint list 124 to generate a filtered set 382. Although not shown, the filtered set 382 includes, without limitation, a subset of the clips 192 included in the cluster to clip engine 186. The constraint list 124 may specify, without limitation, any number and type of constraints associated with the clips 192 in any technically feasible fashion. For example (and as depicted in italics), the constraint list 124 could specify that a maximum acceptable length for each of the clips 192 is sixty seconds. The filtering engine 390 may perform any number and type of evaluation operations on the clips 192 based on any amount and type of data to determine whether each of the clips 192 complies with the constraint list 124. The filtering engine 380 discards any of the clips 192 that do not comply with the constraint list 124 and then adds the remaining clips 192 to the filtered set 382.

In alternate embodiments, the filtering engine 380 may be replaced or supplemented with a modification engine that performs any amount and type of modification operations on the clips 192 based on the constraint list 124 and/or a modification list. For instance, in alternate embodiments, the modification engine may truncate the clips 192 that exceed a maximum acceptable length.

The ranking engine 390 performs any amount and type of ranking operations on the filtered set 382 based on any ranking criterion to generate the clip set 190. The ranking engine 390 may determine the ranking criterion and perform the ranking operations in any technically feasible fashion. For instance, in some embodiments, the ranking engine 390 may determine a scoring function and a total number (denoted as N) of clips 192 that are to be included in the clip set 190 based on user (e.g., an editor) input received via a GUI (not shown). The ranking engine 390 computes a score for each of the clips 192 included in the filtered set 382, ranks the clips 192 included in the filtered set 382 based on the scores, and then generates the clip set 190 that includes, without limitation, the N highest-ranked clips 192. In alternate embodiments (and as depicted with a dotted line), the ranking engine 390 may perform ranking operations based on the clip recipe 170 specified via the clip ID 122.

After generating the clip set 190, the cluster to clip engine 186 transmits any number of the clips 192 included in the clips set 190 to any number of endpoint devices for display. In alternate embodiments, the cluster to clip engine 186 may provide the clip set 190 and/or any number of the clips 192 included in the clip set 190 to any number of software applications for display. In the same or other alternate embodiments, the cluster to clip engine 186 may perform any number of additional operations on the clip set 190 in addition to or instead of transmitting the clip set 190 to endpoint device(s) and/or software application(s) for display.

Figure 4:
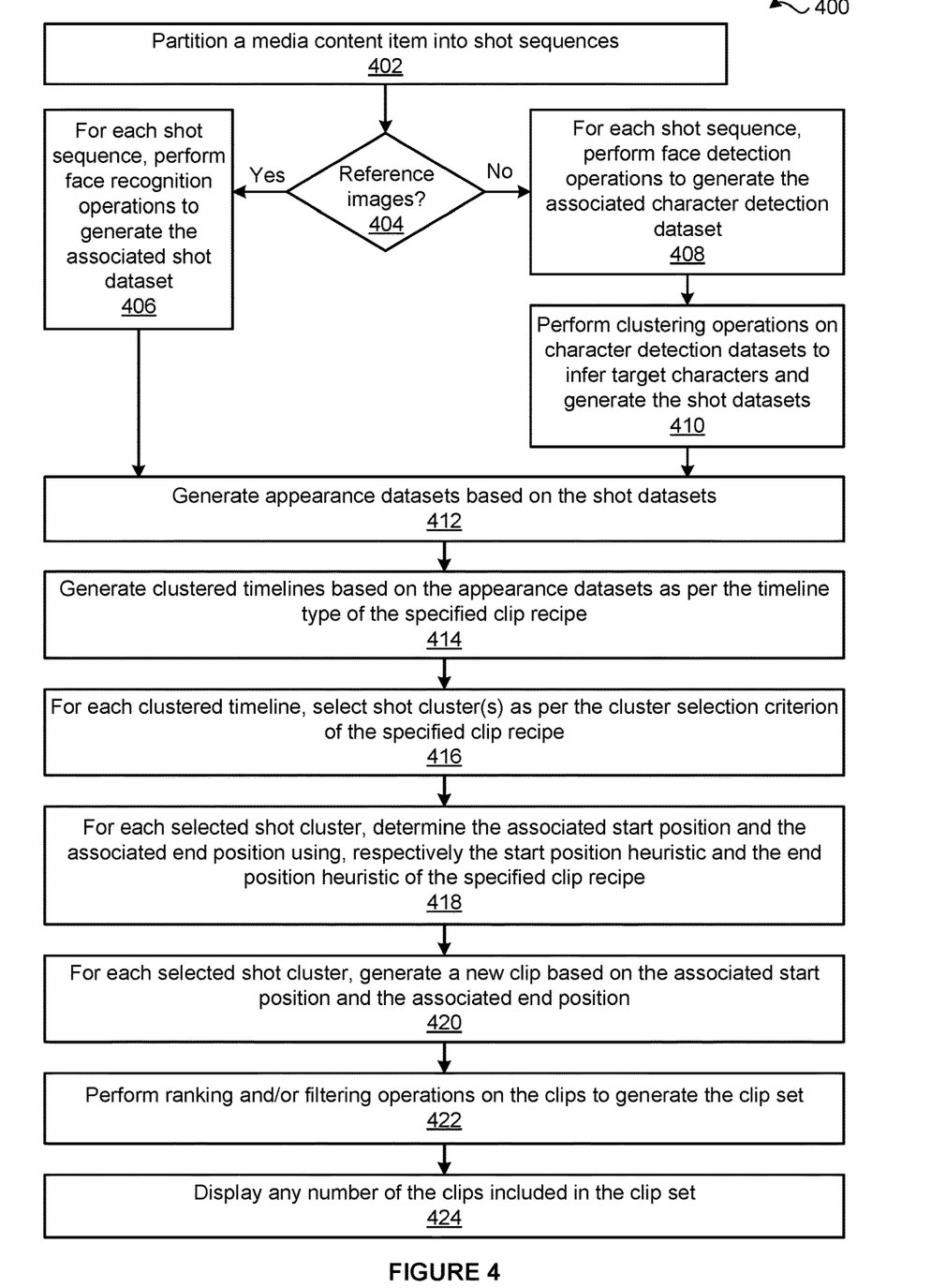
FIG. 4 is a flow diagram of method steps for identifying and extracting one or more clips from a media content item, according to various embodiments.

FIG. 4 is a flow diagram of method steps for identifying and extracting one or more clips from a media content item. Although the method steps are described with reference to the systems of FIGS. 1-3, persons skilled in the art will understand that any system configured to implement the method steps, in any order, falls within the scope of the embodiments.

As shown, a method 400 begins at step 402, where the shot detector 132 partitions the media content item 104 into the shot sequences 106. At step 404, the appearance engine 130 determines whether the appearance engine 130 has acquired the reference images 126. It, at step 406, the appearance engine 130 determines that the appearance engine 130 has acquired the reference images 126, then the method 400 proceeds to step 406. At step 406, for each of the shot sequences 106(x), the face recognition engine 134 performs any number and type of face recognition operations based on the reference images 126 to generate the shot dataset 140(x). The method 400 then proceeds directly to step 412.

If, however, at step 404, the appearance engine 130 determines that the appearance engine 130 has not acquired the reference images 126, then the method 400 proceeds directly to step 408. At step 408, for each of the shot sequence 106, the face detection/clustering engine 136 performs any number of face detection operations to generate an associated character detection dataset. At step 410, the face detection/clustering engine 136 performs clustering operations on the character detection datasets to infer target characters and then generates the shot datasets 140 based on the character clusters representing the target characters.

At step 412, the appearance engine 130 generates the appearance datasets 150 based on the shot datasets 140. At step 414, the clustering engine 182 generates the clustered timelines 184 based on the appearance datasets 150 as per the timeline type 172 of the clip recipe 170 specified via the recipe ID 122. At step 416, for each of the clustered timelines 184, the cluster to clip engine 186 selects any number of the shot clusters 350 as per the cluster selection criterion 184 of the specified clip recipe 170.

At step 418, for each of the selected shot clusters 350, the cluster to clip engine 186 determines the associated start position 360 and the associated end position 370 using, respectively, the start position heuristic 176 and the end position heuristic 178 of the specified clip recipe 170. At step 420, for each of the selected shot clusters 350, the cluster to clip engine 186 generates a new clip 192 based on the associated start position 360 and the associated end position 370.

At step 422, the cluster to clip engine 186 performs any number of ranking and/or filtering operations on the clips 192 to generate the clip set 190. At step 424, the cluster to clip engine 186 transmits any number of the clips 192 included in the clip set 190 to an endpoint device for display. The method 400 then terminates.

Although not shown in FIG. 4, in alternate embodiments, any number of steps 404-424 may be repeated in any order for different recipe IDs 122 specifying different clip recipes 170, different constraint lists 124, different reference images 126, and/or different ranking criteria to generate multiple clips sets 190 for the media content item 104.

In sum, the disclosed techniques may be used to efficiently and reliably generate clips for media content items. In one embodiment, a clip application includes, without limitation, an appearance engine, any number of clip recipes, and a clip generation engine. The appearance engine causes a shot detector to partition the media content item into shot sequences. The appearance engine optionally acquires reference images of target characters. If the appearance engine acquires reference images, then the appearance engine causes a face recognition engine to perform facial detection operations on each shot sequence based on the reference images. Otherwise, the appearance engine causes a face detection/clustering engine to execute facial detection operations on each shot to generate face detection datasets and then perform unsupervised clustering operations over the face detection datasets to infer target characters that are most prevalent in the media content item. Based on the outputs of either the face recognition engine or the face detection/clustering engine, the appearance engine determines frame percentages for each combination of shot sequence and target character. The frame percentage for a given shot sequence and a given target character is the percentage of the frames in the shot sequence in which the target character appears.

The clip generation engine selects one of the clips recipes based on a recipe ID. Each chip recipe encapsulates a different set of heuristics for determining the clips and includes, without limitation, a timeline type, a cluster selection criterion, a start position heuristic, and an end position heuristic. Examples of clip recipes include, without limitation, a character clip recipe, an interaction clip recipe, and a close-up clip recipe. Based on the timeline type, the clip generation engine generates any number of clustered timelines. Each clustered timeline is associated with either a target character or a pair of target characters. To generate a clustered timeline, the clip generation engine performs unsupervised clustering operations on the shot sequences based on the frame percentages relevant to the associated target character(s). Each clustered timeline may include, without limitation, any number of shot clusters, where each shot cluster includes, without limitation, any number of temporally sequential shot sequences.

The clip generation engine selects one or more shot clusters in each of the clustered timelines based on the cluster selection criteria. The clip generation engine then selects at least a portion of each selected shot cluster as an associated clip based on the start position heuristic and the end position heuristic. Subsequently, the clip generation engine performs any number of filtering operations and any number of ranking operations on the clips based on any number and type of criteria to generate a clip set that includes a subset of the clips. The clip generation engine then transmits the clip set to an endpoint device for display.

At least one technical advantage of the disclosed techniques relative to the prior art is that the clip application can be used to more efficiently and reliably generate effective clips for media content items. By automatically identifying self-contained sequences of events that feature one or more target characters, the clip generation engine can determine interesting portions of a media content item without requiring a person to watch the entire media content item. Consequently, the time and amount of manual work required to determine the clips can be reduced. Furthermore, because the clip generation engine determines clips based on clip recipes that encapsulate objective heuristics instead of more subjective criteria, the effectiveness and reliability of the generated clips can be increased. Yet another advantage of using the clip application to generate clips is that the clip recipe, reference images, constraints, etc., can be selected to further enhance the overall effectiveness of the clips. These technical advantages provide one or more technological advancements over the prior art.

1. In some embodiments, a computer-implemented method comprises computing a plurality of appearance values for an appearance metric based on a plurality of shot sequences associated with a media content item, wherein each appearance value included in the plurality of appearance values indicates a prevalence of a first character in a different shot sequence included in the plurality of shot sequences; performing one or more clustering operations on the plurality of shot sequences based on the plurality of appearance values to generate a first shot cluster; generating a clip for the media content based on the first shot cluster; and transmitting the clip to an endpoint device for display.
2. The computer-implemented method of clause 1, wherein the first shot cluster comprises at least one temporally sequential shot sequence included in the plurality of shot sequences.
3. The computer-implemented method of clauses 1 or 2, wherein performing the one or more clustering operations comprises representing the plurality of shot sequences as a timeline; and executing a clustering algorithm on the timeline based on the plurality of appearance values to generate a plurality of shot clusters that includes the first shot cluster.
4. The computer-implemented method of any of clauses 1-3, wherein a first appearance value included in the plurality of appearance values specifies a percentage of frames within a first shot sequence that include the first character.
5. The computer-implemented method of any of clauses 1-4, wherein generating the clip comprises for the first shot cluster, setting a beginning shot sequence equal to the temporally earliest shot sequence that includes the first character; and setting the clip equal to at least a portion of the first media content item that extends from the beginning shot sequence to an ending shot sequence included in the first shot cluster.
6. The computer-implemented method of any of clauses 1-5, wherein generating the clip comprises for the first shot cluster, setting a beginning shot sequence equal to the temporally earliest shot sequence that includes both the first character and a second character; and setting the clip equal to at least a portion of the first media content item that extends from the beginning shot sequence to an ending shot sequence included in the first shot cluster.
7. The computer-implemented method of any of clauses 1-6, wherein generating the first clip comprises for the first shot cluster, setting an ending shot sequence equal to the temporally earliest shot sequence that includes a close-up image of the first character; and setting the clip equal to at least a portion of the first media content item that extends from a beginning shot sequence included in the first shot cluster to the ending shot sequence.
8. The computer-implemented method of any of clauses 1-7, wherein computing the plurality of appearance values comprises, for each shot sequence included in the plurality of shot sequences, performing one or more face recognition operations on the shot sequence based on a reference image associated with the first character to determine a prevalence of the first character within the shot sequence.
9. The computer-implemented method of any of clauses 1-8, wherein computing the plurality of appearance values comprises for each shot sequence included in the plurality of shot sequences, performing one or more face detection operations on the shot sequence to generate a character detection dataset; performing one or more clustering operations across the character detection datasets to determine a plurality of character clusters; and generating the plurality of appearance values based on the largest character cluster included in the plurality of character clusters.
10. The computer-implemented method of any of clauses 1-9, wherein the first media content item comprises a feature-length movie, an episode of a television show, or a podcast.
11. In some embodiments, one or more non-transitory computer readable media include instructions that, when executed by one or more processors, cause the one or more processors to perform the steps of computing a plurality of appearance values for an appearance metric based on a plurality of shot sequences associated with a media content item, wherein each appearance value included in the plurality of appearance values indicates a prevalence of a first character in a different shot sequence included in the plurality of shot sequences; generating a plurality of shot clusters based on the plurality of appearance values, wherein each shot cluster included in the plurality of shot clusters includes a different subset of shot sequences included in the plurality of shot sequences; generating a clip for the media content based on a first shot cluster included in the plurality of clusters; and transmitting the clip to an endpoint device for display.
12. The one or more non-transitory computer readable media of clause 11, wherein generating the plurality of shot clusters comprises representing the plurality of shot sequences as a timeline; and executing a clustering algorithm on the timeline based on the plurality of appearance values.
13. The one or more non-transitory computer readable media of clauses 11 or 12, wherein the clustering algorithm comprises a k-means clustering algorithm
14. The one or more non-transitory computer readable media of any of clauses 11-13, wherein a first appearance value included in the plurality of appearance values specifies a percentage of frames within a first shot sequence that include the first character.
15. The one or more non-transitory computer readable media of any of clauses 11-14, wherein generating the clip comprises determining a subset of shot sequences included in the first shot cluster that introduce the first character, depict an interaction between the first character and a second character, or include a close-up image of the first character.

16. The one or more non-transitory computer readable media of any of clauses 11-15, wherein computing the plurality of appearance values comprises, for each shot sequence included in the plurality of shot sequences, performing one or more face recognition operations on the shot sequence based on a reference image associated with the first character to determine a prevalence of the first character within the shot sequence.

17. The one or more non-transitory computer readable media of any of clauses 11-16, wherein computing the plurality of appearance values comprises, for each shot sequence included in the plurality of shot sequences, performing one or more face detection operations on the shot sequence to generate a character detection dataset; performing one or more clustering operations across the character detection datasets to determine a plurality of character clusters; and generating the plurality of appearance values based on the largest character cluster included in the plurality of character clusters.

18. The one or more non-transitory computer readable media of any of clauses 11-17, wherein performing the one or more clustering operations across the character detection datasets comprises executing a randomized graph-clustering algorithm on the character detection datasets.

19. The one or more non-transitory computer readable media of any of clauses 11-18, wherein the first media content item comprises a feature-length movie, an episode of a television show, or a podcast.

20. In some embodiments, a system comprises one or more memories storing instructions; and one or more processors that are coupled to the one or more memories and, when executing the instructions, are configured to partition a media content item into a plurality of shot sequences; for each shot sequence included in the plurality of shot sequences, compute a different appearance value included in a plurality of appearance values based on the prevalence of a first character in the shot sequence; perform one or more clustering operations on the plurality of shot sequences based on the plurality of appearance values to generate a first shot cluster; generate a clip for the media content based on the first shot cluster; and transmit the clip to an endpoint device for display.

Any and all combinations of any of the claim elements recited in any of the claims and/or any elements described in this application, in any fashion, fall within the contemplated scope of the embodiments and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for generating clips for media content items, the method comprising:
    computing, for each shot sequence included in a first plurality of different shot sequences of a media content item, at least one appearance value for an appearance metric, wherein the media content item has previously been partitioned into the first plurality of different shot sequences based on each shot sequence included in the first plurality of different shot sequences being captured from a different respective point of capture than one or more temporally adjacent shot sequences;
    identifying a plurality of different temporally sequential shot sequences within the first plurality of different shot sequences based on similarities in appearance values across a subset of appearance values for the plurality of different temporally sequential shot sequences to generate a first shot cluster;
    generating a clip for the media content item based on the first shot cluster; and
    transmitting the clip to an endpoint device for display.

2. The computer-implemented method of claim 1, wherein identifying the plurality of different temporally sequential shot sequences comprises:
    generating a timeline of the first plurality of different shot sequences; and
    executing a clustering algorithm on the timeline based on a plurality of appearance values to generate at least the first shot cluster.

3. The computer-implemented method of claim 1, wherein a timeline associated with identifying the plurality of different temporally sequential shot sequences comprises a first axis representing a temporal ordering of the first plurality of different shot sequences.

4. The computer-implemented method of claim 1, wherein the first shot cluster is added to the clip based on at least one cluster selection criterion.

5. The computer-implemented method of claim 1, wherein generating the clip comprises determining at least one of a start position or an end position associated with the first shot cluster based on one or more heuristics.

6. The computer-implemented method of claim 1, wherein the first plurality of different shot sequences comprises a first shot sequence captured from a first point of capture and a second shot sequence captured from a second point of capture.

7. The computer-implemented method of claim 1, wherein a first appearance value included in a plurality of appearance values indicates a prevalence of a second character within a shot sequence included in the first plurality of different shot sequences that includes a first character.

8. The computer-implemented method of claim 1, wherein a first appearance value included in a plurality of appearance values specifies a percentage of frames within a first shot sequence that includes a first character.

9. One or more non-transitory computer-readable media storing instructions that, when executed by one or more processors, cause the one or more processors to perform the steps of:
    computing, for each shot sequence included in a first plurality of different shot sequences of a media content item, at least one appearance value for an appearance metric, wherein the media content item has previously been partitioned into the first plurality of different shot sequences based on each shot sequence included in the first plurality of different shot sequences being captured from a different respective point of capture than one or more temporally adjacent shot sequences;
    identifying a plurality of different temporally sequential shot sequences within the first plurality of different shot sequences based on similarities in appearance values across a subset of appearance values for the plurality of different temporally sequential shot sequences to generate a first shot cluster;
    generating a clip for the media content item based on the first shot cluster; and
    transmitting the clip to an endpoint device for display.

10. The one or more non-transitory computer-readable media of claim 9, wherein identifying the plurality of different temporally sequential shot sequences comprises:
    generating a timeline of the first plurality of different shot sequences; and
    executing a clustering algorithm on the timeline based on a plurality of appearance values to generate a plurality of shot clusters that includes the first shot cluster.

11. The one or more non-transitory computer-readable media of claim 9, wherein a timeline associated with identifying the plurality of different temporally sequential shot sequences comprises a first axis representing a temporal ordering of the first plurality of different shot sequences and a second axis representing the appearance values for the first plurality of different shot sequences.

12. The one or more non-transitory computer-readable media of claim 9, wherein the instructions further cause the one or more processors to perform the step of verifying that the clip meets one or more constraints prior to transmitting the clip to the endpoint device for display.

13. The one or more non-transitory computer-readable media of claim 9, wherein generating the clip comprises adding the first shot cluster to the clip based on at least one cluster selection criterion.

14. The one or more non-transitory computer-readable media of claim 9, wherein generating the clip comprises determining at least one of a start position or an end position associated with the first shot cluster based on one or more heuristics.

15. The one or more non-transitory computer-readable media of claim 9, wherein a first appearance value included in a plurality of appearance values specifies a percentage of frames within a first shot sequence that includes a first character.

16. A system, comprising:
    one or more memories that store instructions, and
    one or more processors that are coupled to the one or more memories and, when executing the instructions, are configured to:
        compute, for each shot sequence included in a first plurality of different shot sequences of a media content item, at least one appearance value for an appearance metric, wherein the media content item has previously been partitioned into the first plurality of different shot sequences based on each shot sequence included in the first plurality of different shot sequences being captured from a different respective point of capture than one or more temporally adjacent shot sequences;
        identify a plurality of different temporally sequential shot sequences within the first plurality of different shot sequences based on similarities in appearance values across a subset of appearance values for the plurality of different temporally sequential shot sequences to generate a first shot cluster;
generate a clip for the media content item based on the first shot cluster; and
transmit the clip to an endpoint device for display.

* * * * *